(12) United States Patent
Kolev et al.

(10) Patent No.: US 12,164,604 B2
(45) Date of Patent: Dec. 10, 2024

(54) DIGITAL RIGHTS MANAGEMENT INTERFACE

(71) Applicant: Comcast Cable Communications, LLC, Philadelphia, PA (US)

(72) Inventors: Nikola Kolev, Devon, PA (US); Kyong Park, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 441 days.

(21) Appl. No.: 16/047,964

(22) Filed: Jul. 27, 2018

(65) Prior Publication Data

US 2020/0034515 A1  Jan. 30, 2020

(51) Int. Cl.
*G06F 21/10* (2013.01)
*H04L 9/08* (2006.01)

(52) U.S. Cl.
CPC .............. *G06F 21/10* (2013.01); *H04L 9/083* (2013.01); *G06F 2221/2141* (2013.01); *H04L 2209/603* (2013.01)

(58) Field of Classification Search
CPC ...... G06F 21/10; G06F 21/105; G06F 21/602; G06F 2221/2141; H04L 9/083; H04L 2209/603
See application file for complete search history.

(56) References Cited

U.S. PATENT DOCUMENTS

| | | | | |
|---|---|---|---|---|
| 6,944,776 | B1* | 9/2005 | Lockhart | G06F 21/10 705/59 |
| 8,660,545 | B1* | 2/2014 | Redford | H04N 21/41265 455/418 |
| 8,688,583 | B2* | 4/2014 | Boccon-Gibod | H04L 63/08 705/50 |
| 9,785,759 | B1* | 10/2017 | Dorwin | G06F 21/602 |
| 11,228,427 | B2* | 1/2022 | Nair | H04L 9/0825 |
| 2006/0242073 | A1* | 10/2006 | Padawer | G06Q 30/06 705/51 |
| 2008/0086757 | A1* | 4/2008 | Pestoni | H04N 21/84 713/165 |
| 2010/0064378 | A1* | 3/2010 | Hwang | G06Q 30/0601 380/278 |
| 2010/0180347 | A1* | 7/2010 | Vargza | G06Q 30/06 726/26 |
| 2013/0054394 | A1* | 2/2013 | Thompson | G06Q 20/1235 705/21 |

(Continued)

OTHER PUBLICATIONS

Y. Jeong, J. Park, J. Kim and K. Yoon, "DRM Content Adaptation Scheme Between Different DRM Systems for Seamless Content Service," 2007 IEEE International Conference on Multimedia and Expo, Beijing, China, 2007, pp. 867-870. (Year: 2007).*

(Continued)

*Primary Examiner* — Kari L Schmidt
(74) *Attorney, Agent, or Firm* — Ballard Spahr LLP

(57) ABSTRACT

Disclosed are systems and methods for a digital rights management (DRM) interface. A DRM request can be received via a scheme-agnostic application program interface (API). A scheme-specific request based on the DRM request can be transmitted via a scheme-specific API. A response to the scheme-specific request can be received via the scheme-specific API. A response to the DRM request can be transmitted via the scheme-agnostic API.

20 Claims, 6 Drawing Sheets

(56) References Cited

U.S. PATENT DOCUMENTS

| | | | | |
|---|---|---|---|---|
| 2013/0205401 | A1* | 8/2013 | Lin | G06F 21/10 |
| | | | | 726/26 |
| 2013/0219512 | A1* | 8/2013 | Lin | G06F 21/10 |
| | | | | 726/27 |
| 2014/0365759 | A1* | 12/2014 | Wang | H04L 63/0428 |
| | | | | 713/151 |
| 2015/0096053 | A1* | 4/2015 | Negrea | H04L 63/101 |
| | | | | 726/28 |
| 2015/0269357 | A1* | 9/2015 | Taneja | G06F 21/10 |
| | | | | 726/29 |
| 2016/0072807 | A1* | 3/2016 | Park | H04L 9/3263 |
| | | | | 713/171 |
| 2016/0198202 | A1* | 7/2016 | Van Brandenburg | |
| | | | | H04N 21/2347 |
| | | | | 725/31 |
| 2016/0315956 | A1* | 10/2016 | Giladi | H04N 21/85406 |
| 2018/0035139 | A1* | 2/2018 | Giladi | H04L 65/607 |
| 2018/0150620 | A1* | 5/2018 | Hensgen | G06F 21/602 |
| 2018/0309762 | A1* | 10/2018 | Hussain | G06F 21/10 |

OTHER PUBLICATIONS

Alexandra Mikityuk, et al. Content Protection in HTML5 TV Platforms: Towards Browser-agnostic DRM and Cloud UI Environments. In Proceedings of the 5th International Workshop on Trustworthy Embedded Devices (TrustED '15). Association for Computing Machinery, New York, NY, USA, 2015, 43-52. (Year: 2015).*

* cited by examiner

DIGITAL RIGHTS MANAGEMENT INTERFACE

BACKGROUND

Digital rights management (DRM) software can be used to determine and enforce access rights to content items. Different content items may each use one of many DRM solutions. A user device may need to use different application program interfaces (APIs) and/or protocols for each of these DRM solutions. This requires the user device to maintain and/or update the various APIs, and requires increased computational complexity in order to generate requests and process responses for the various APIs. These and other shortcomings are addressed by the approaches set forth herein.

SUMMARY

It is to be understood that both the following general description and the following detailed description are exemplary and explanatory only and are not restrictive. Provided are methods and systems for a digital rights management (DRM) interface. A DRM request can be received from a user device via a scheme-agnostic application program interface (API), e.g., by a shared DRM server. The DRM request can include a request for an access rights decision and/or a request for a key to decrypt encrypted content. The DRM request can also identify a particular DRM scheme corresponding to a particular DRM vendor. Based on the received DRM request, a scheme-specific request can be generated, e.g., by the shared DRM server. For example, the scheme-specific request can be generated to conform to a protocol and/or a scheme-specific API used for the particular DRM scheme. The scheme-specific request can be transmitted (e.g., by the shared DRM server) to a DRM vendor associated with the particular DRM scheme. A response to the scheme-specific request can be received, e.g., via the scheme-specific API from the DRM vendor. The response can include the access rights decision or the key. Based on the response to the scheme-specific request, a request can be generated and transmitted to the user device via the scheme-agnostic API. Thus, DRM requests for various DRM schemes can be received and processed using the same scheme-agnostic API.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
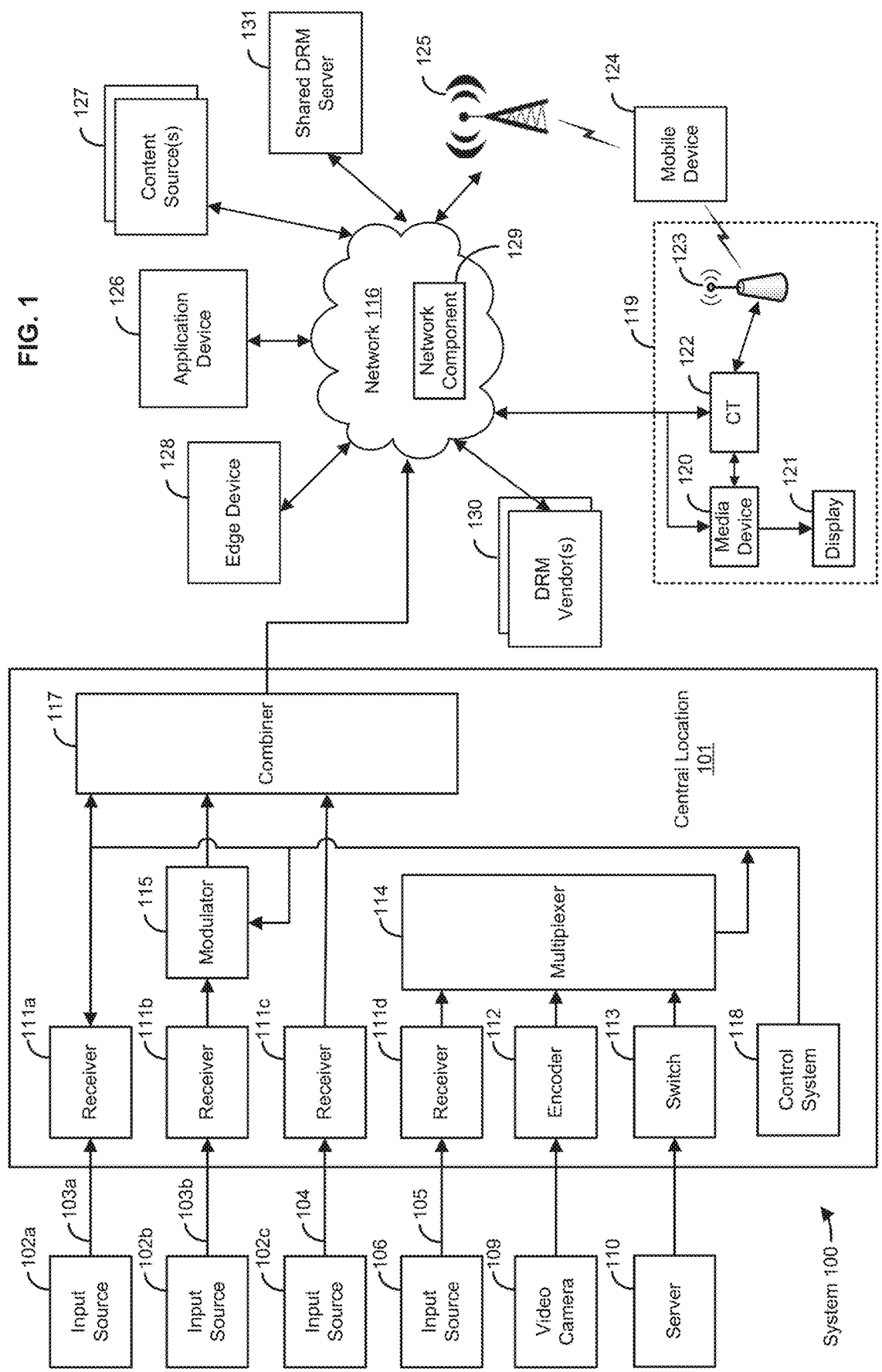
FIG. 1 is a diagram of an example content distribution network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4 k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

This disclosure relates generally to employing digital rights management (DRM) for content that is accessed and distributed via multiple application program interfaces (APIs). Methods and systems are disclosed that can be configured as, and/or to utilize, a single API that can reside in a multi DRM service system configured to distribute DRM data across multiple software stacks. The methods and systems disclosed can thus be configured to accommodate one protocol and a single "language" for multiple DRM schemes.

The present disclosure relates to a digital rights management interface. Digital rights management can refer to any scheme that controls access to copyrighted material using technological means. In essence, DRM removes usage control from the person in possession of content and puts it in the hands of computer software. Digital rights management (DRM) software can be used to enforce access rights to content. For example, DRM software can be used to make access rights decisions to determine whether a given user and/or user device is authorized to access a particular content item. DRM software can also be used to encrypt and/or decrypt content items.

A particular DRM scheme used to enforce access rights may vary depending on a particular content item, a user device requesting the content item, a content provider associated with the content item, and/or other variables. Additionally, each DRM scheme may use different protocols and/or application program interfaces to communicate with the user device requesting the content item. Thus, a user device cannot use a single protocol or API to engage a DRM system (e.g., a DRM server) to conduct the various access rights decisions needed to access different content items.

A shared DRM server can be configured to expose a scheme-agnostic API to user devices. A user device can transmit a DRM request to the shared DRM server via the scheme-agnostic API, The DRM request can include, for example, a request for an access rights decision and/or a request for a key to decrypt content. The DRM request can also include an identifier of a DRM scheme associated with content. The shared DRM server can determine a DRM scheme of a plurality of DRM schemes associated with the DRM request, e.g., based on the identifier in the DRM request. The shared DRM server can then generate a scheme-specific request corresponding to the DRM scheme. The scheme-specific request can be transmitted, e.g., via a scheme-specific API corresponding to the DRM scheme. For example, the scheme-specific request can be transmitted to a DRM vendor corresponding to the DRM scheme.

The shared DRM server can then receive a response to the scheme-specific request, e.g., via the scheme-specific API corresponding to the DRM scheme. A response to the original DRM request received from the user device via the scheme-agnostic API can be generated based on the response to the scheme-specific request. For example, an access rights decision and/or key in the response to the scheme-specific request can be included in the response to the original DRM request received via the scheme-agnostic API. The response to the original DRM request can then be transmitted to the user device via the scheme-agnostic API. Thus, DRM access rights decisions for multiple DRM schemes for one or more user devices can be resolved using a single scheme-agnostic API and the shared DRM server.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct teed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an aspect, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

In an aspect, the system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users download applications to a device, such as the mobile device 124, communications terminal 122, the media device 120, the display device 121, and/or the like. The application device 126 can run one or more application services to provide data, handle requests, and/or otherwise facilitate operation of applications for the user.

In an aspect, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

One or more Digital Rights Management (DRM) vendors 130 can be configured to enforce a particular DRM scheme for one or more content items provided by the content source(s) 127. The DRM vendors 130 can include one or more computing devices in communication with the shared DRM server 131 and or a user device (e.g., a media device 120 and/or a mobile device 124) via the network 116. A content provider (e.g., a content network, a content channel, and/or a content distributor) can engage with a. DRM vendor to apply and/or enforce a DRM scheme for content items of the content provider. Enforcing a DRM scheme can include performing encryption and/or decryption of content. Enforcing a DRM scheme can also include generating and/or applying metadata to content. Such metadata can include identifiers of the particular DRM scheme, identifiers of the DRM vendor 130 (e.g., a network address of the DRM vendor 130), or other metadata. Enforcing a DRM scheme can also include generating, maintaining, and transmitting encryption keys and/or decryption keys. For example, the DRM vendor 130 can transmit encryption keys and/or associated metadata to a recipient CT 122, content source 127, and/or edge device 128 to facilitate encryption of content. As another example, the content can be encrypted and the metadata applied to the content by the DRM vendor 130. Enforcing a DRM scheme can also include performing access rights decisions, e.g., determining whether a particular user, device, or session can access a particular content item. Accordingly, DRM vendors 130 can implement an application program interface (e.g., a scheme-specific API) to facilitate the processing of requests (e.g., scheme-specific requests) associated with a particular DRM scheme. Each scheme-specific API can expose one or more API functions for the particular DRM scheme. Additionally, scheme-specific requests and/or responses to scheme-specific requests can be encoded or generated according to a particular protocol corresponding to the particular DRM scheme. In other words, each DRM vendor 130 may implement their own respective scheme-specific API for processing scheme-specific requests for their particular DRM scheme.

A shared DRM server 131 can be in communication via the network 116 with the DRM vendor 130 and/or user devices, a media device 120, or a mobile device 124. The shared DRM server 131 can be configured to process DRM requests from user devices, e.g., a media device 120, a mobile device 124, or another user device. To do so, the shared DRM server 131 may implement a scheme-agnostic API exposed to user devices. A user device 131 can use the scheme-agnostic API to generate a DRM request in order to access and/or render content that is protected under a particular DRM scheme, e.g., FairPlay, Marlin, SharePoint. The DRM request can include, for example, a request for an access rights decision for a particular content item protected under a particular DRM scheme. The DRM request can include an identifier for the content item. The DRM request can also include device identifiers, session identifiers, user account identifiers, authentication credentials, or other data that may facilitate processing a DRM request by a DRM vendor 130. The DRM request can also include an identifier of the particular DRM scheme protecting the particular content item. Thus, the shared DRM server 131 (e.g., via the scheme-agnostic API) can accept DRM requests associated with any content item and any DRM scheme. This allows the user devices to transmit all DRM requests to the shared DRM server 131, instead of transmitting scheme-specific requests (e.g., encoded under a scheme-specific protocol and/or processed via a scheme-specific API) to a particular DRM vendor 130.

In response to receiving the DRM request from a user device, the shared DRM server 131 can be configured to determine a particular DRM scheme from a plurality of DRM schemes. For example, the shared DRM server 131 can determine, based on an identifier of a DRM scheme included in the DRM request, the particular DRM scheme, e.g., by a look up table or database. The database and/or look up table can indicate a schema, format, or protocol for a scheme-specific request for the particular DRM scheme. As an example, the database and/or look up table can identify one or more parameters to be included on the scheme-specific request. The shared DRM server 131 can then generate, based on the received DRM request, the scheme-specific request according to the determined particular DRM scheme. For example, the shared DRM server 131 can generate a request to be communicated to a DRM vendor 130 corresponding to the determined particular DRM scheme via a scheme-specific API. As another example, the shared DRM server 131 can generate a request according to a particular protocol for the determined particular DRM scheme. Generating the scheme-specific request can include generating the scheme-specific request comprising one or more data points included in the DRM request received via the scheme-agnostic API. Such one or more data points can include an identifier of a content item, user device, session, user account, or other data that can facilitate processing the scheme-specific request by an associated DRM vendor 130. The scheme-specific DRM request can also include additional parameters not included in the DRM request received via the scheme-agnostic API. Accordingly, the shared DRM server 131 can determine and/or generate the additional parameters for inclusion in the scheme-specific DRM request.

The shared DRM server 131 can receive a response to the scheme-specific request from the DRM vendor 130 to which the scheme-specific request was transmitted. For example, the shared DRM server 131 can transmit a scheme-specific request to a DRM vendor 130 via a scheme-specific API, and receive a response from the DRM vendor 130 via the scheme-specific API. The response to the scheme-specific request can include, for example, an access rights decision (e.g., granting or denying access to a content item), an encryption or decryption key, a manifest, or other data. The shared DRM server 131 can then generate, based on the response to the scheme-specific request, a response to the DRM request that was received via the scheme-agnostic API. For example, the shared DRM server 131 can generate the response to the DRM request as including one or more data items included in the response to the scheme-specific request (e.g., an access rights decision, key, and/or manifest). The shared. DRM server 131 can also determine or generate one or more data items for inclusion in the response to the DRM request. The shared DRM server 131 can transmit the response to the DRM request to the user device via the scheme-agnostic API.

In an aspect, the network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

Figure 2:
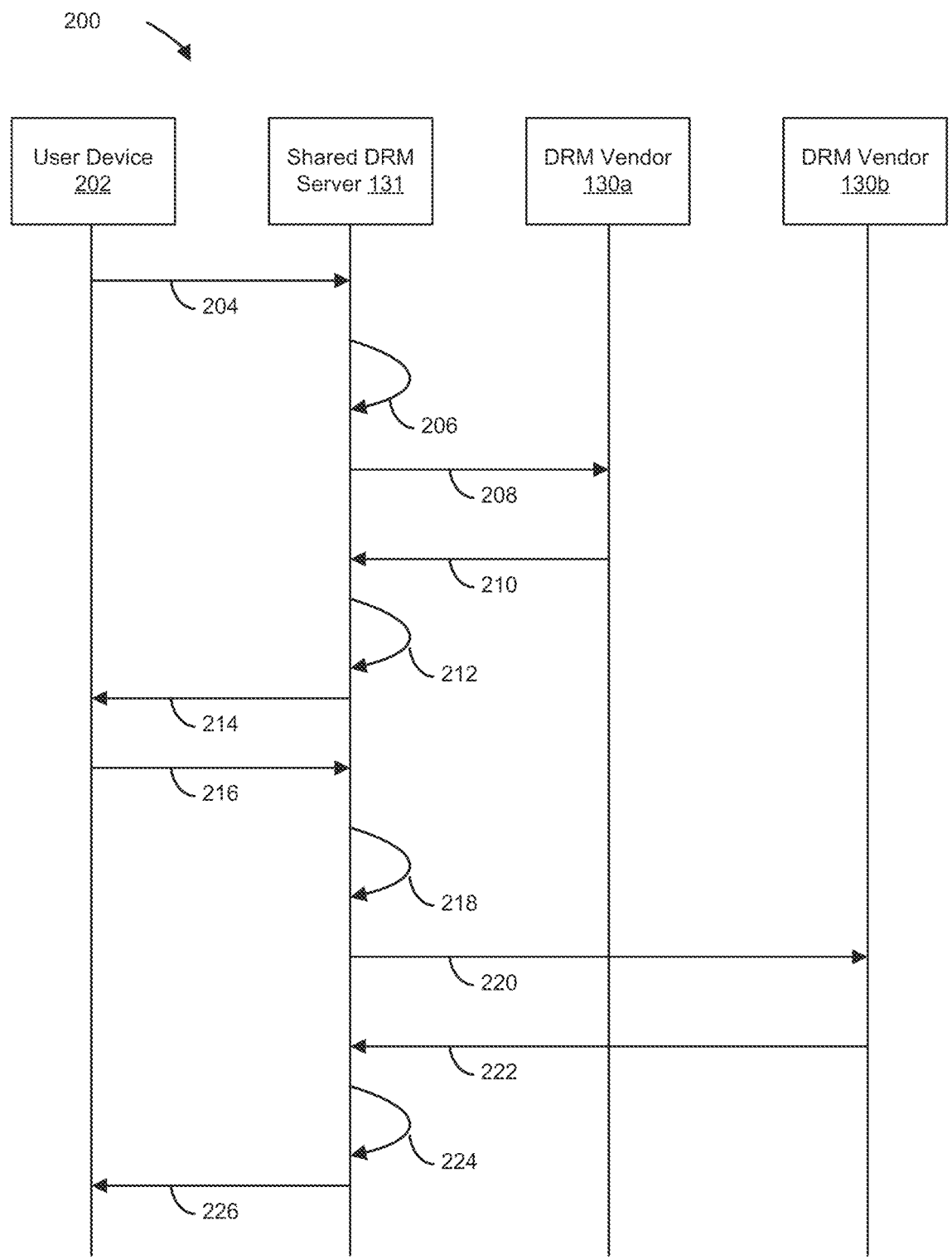
FIG. 2 is an example communications flow.

FIG. 2 is an example communications flow 200. A user device 202 (e.g., a media device 120, a mobile device 124, or other computing device) transmits a first DRM request to the shared DRM server 131 at step 204. The first DRM request can comprise a request to access or playback a first content item that is protected under a first DRM scheme, e.g., FairPlay or SharePoint. The first DRM request can include a content item identifier, session identifier, device identifier, account identifier, authentication credential, a DRM scheme identifier, or other data. The first DRM request can also include one or more business attributes, including the account identifier, the device identifier, or the content identifier. The first DRM request can be transmitted to the shared DRM server 131 via a scheme-agnostic API exposed by the shared DRM server 131.

At step 206 the shared DRM server 131 generates a first scheme-specific request. Generating the first scheme-specific request can include determining the first DRM scheme, e.g., from a plurality of DRM schemes, e.g., FairPlay, SharePoint, Advanced Access Content System (AACS), Marlin. For example, the shared DRM server 131 can determine the first DRM scheme based on a DRM scheme identifier included in the first DRM request. The first scheme-specific request can be generated by the shared DRM server 131 to include one or more data points from the first DRM request received via the scheme-agnostic API, e.g., a session identifier, device identifier, account identifier, authentication credential, a DRM scheme identifier, or other data. If the first DRM request included one or more business attributes, these one or more business attributes can be included in or excluded from the first scheme-specific request. Business attributes are attributes that can be used to generate usage statistics or derive user behaviors, such as account identifiers, device identifiers, or the content identifiers. The first scheme-specific request can be generated by the shared DRM server 131 according to a first protocol used under the determined first DRM scheme.

At step 208 the shared DRM server 131 transmits the first scheme-specific request to a first DRM vendor 130a corresponding to the determined first DRM scheme. The shared DRM server 131 can transmit the first scheme-specific request via a first scheme-specific API exposed by the first DRM vendor 130a for processing scheme-specific DRM requests for the determined first DRM scheme. The first DRM vendor 130a processes the first scheme-specific request according to the particular DRM scheme associated with the first DRM vendor 130 to generate a response to the first scheme-specific request. The response to the first scheme-specific request can include an access rights decision (e.g., granting or denying access to a content item), an encryption or decryption key, a manifest, or other data.

At step 210 the first DRM vendor 130a transmits the response to the first scheme-specific request to the shared DRM server 131. The shared DRM server 131 receives the response to the first scheme-specific request from the DRM vendor 130a. The response to the first scheme-specific request can be received via the first scheme-specific API exposed by the DRM vendor 130a.

At step 212 the shared DRM server 131 generates, based on the response to the first scheme-specific request received at step 210, a response to the first DRM request received via the scheme-agnostic API. For example, the response to the first DRM request can be generated to include one or more data points included in the response to the first scheme-specific request, e.g. an access rights decision (e.g., granting or denying access to a content item), an encryption or decryption key, a manifest, or other data. The shared DRM server 131 can also generate or calculate one or more data points for inclusion in the response to the first DRM request. The shared DRM server 131 can generate the response to the first DRM request according to a protocol different from that of the response to the first scheme-specific request. For example, the response to the first scheme-specific request can conform to a format or protocol associated with a particular DRM scheme, e.g., FairPlay or SharePoint, while the response to the first DRM request can be generated according to a protocol that is DRM scheme agnostic (e.g., not associated with any particular or specific DRM scheme). This allows the user device 202 to communicate with the shared DRM server 131 using a same protocol regardless of the DRM scheme associated with the content and regardless of the protocols and/pr APIs implemented by the DRM vendor 130a. In other words, as the user device 202 transmits its DRM requests to the shared DRIVE server 131 instead of directly to a particular DRM vendor, the DRM requests made by the user device to access content protected under a variety of DRM schemes can be generated according to the same protocol. This provides the advantage of increased compatibility and simplicity with the user device 202 when compared to existing solutions where the user device 202 would be required to generate requests and support the APIs and protocols of each DRM vendor that may be accessed. The response to the first DRM request can then be transmitted to the user device 202 via the scheme-agnostic API at step 214. The user device 202 then processes the response to the first DRM request to allow playback of content. For example, the user device 202 can use a decryption key in the response to the first DRM request to decrypt one or more portions of content. As another example, the user device 202 can use a manifest in the response to the first DRM request to generate requests for one or more portions of streaming content.

At step 216 the user device 202 transmits a second DRM request to the shared DRM server 131. The second DRM request can comprise a request to access or playback a second content item that is protected under a second DRM scheme, e.g., FairPlay, SharePoint, AACS, Marlin. The second DRM request can include a content item identifier, session identifier, device identifier, account identifier, authentication credential, a DRM scheme identifier, or other data. The second DRM request can also include one or more business attributes, including the account identifier, the device identifier, or the content identifier. The second DRM request can be transmitted to the shared DRM server 131 via a scheme-agnostic API exposed by the shared DRM server 131. In other words, both the first DRM request (transmitted at step 204) and the second DRM request, each associated with different DRM schemes, can each be transmitted to the shared DRM server 131 via the same scheme-agnostic API and/or protocol.

At step 218 the shared DRM server 131 generates a second scheme-specific request. Generating the second scheme-specific request can include determining the second DRM scheme, e.g. from a plurality of DRM schemes. For example, the shared DRM server 131 can determine the second DRM scheme based on a DRM scheme identifier included in the second DRM request. The second scheme-specific request can be generated by the shared DRM server 131 to include one or more data points from the second DRM request received via the scheme-agnostic API, e.g., a session identifier, device identifier, account identifier, authentication credential, a DRM scheme identifier, or other data. If the second DRM request included one or more business attributes (e.g., a device identifier, an account identifier, a content identifier), these one or more business attributes can be included in or excluded from the second scheme-specific request. The second scheme-specific request can be generated by the shared DRM server 131 according to a second protocol used under the determined second DRM scheme. The determined second DRM scheme can be different from the determined first DRM scheme. Accordingly, the second protocol can be different from the first protocol.

At step 220 the shared DRM server 131 transmits the second scheme-specific request to a second DRM vendor 130b corresponding to the determined second DRM scheme. The shared DRM server 131 can transmit the second scheme-specific request via a second scheme-specific API exposed by the second DRM vendor 130b for processing scheme-specific DRM requests for the determined second DRM scheme. As the second DRM scheme can be different from the first DRM scheme, the second scheme-specific API can be different from the first scheme-specific API. The second DRM vendor 130b processes the second scheme-specific request according to the particular DRM scheme associated with the second DRM vendor 130 to generate a response to the first scheme-specific request. The response to the second scheme-specific request can include an access rights decision (e.g., granting or denying access to a content item), an encryption or decryption key, a manifest, or other data.

At step 222 the second DRM vendor 130b transmits the response to the second scheme-specific request to the shared DRM server 131. The shared DRM server 131 receives the response to the second scheme-specific request from the DRM vendor 130b. The response to the second scheme-specific request can be received via the second scheme-specific API exposed by the DRM vendor 130b.

At step 224 the shared DRM server 131 generates, based on the response to the second scheme-specific request received at step 222, a response to the second DRM request received via the scheme-agnostic API. For example, the response to the second DRM request can be generated to include one or more data points included in the response to the second scheme-specific request, e.g. an access rights decision (e.g., granting or denying access to a content item), an encryption or decryption key, a manifest, or other data. The shared DRM server 131 can also generate or calculate one or more data points for inclusion in the response to the second DRM request. The shared DRM server 131 can generate the response to the second DRM request according to a protocol different from that of the response to the second scheme-specific request. For example, the response to the second scheme-specific request can conform to a format or protocol associated with a particular DRM scheme, e.g., AACU or Marlin, while the response to the second DRM request can be generated according to a protocol that is DRM scheme agnostic (e.g., not associated with any particular or specific DRM scheme). The response to the second DRM request can then be transmitted to the user device 202 via the scheme-agnostic API at step 226.

Figure 3:
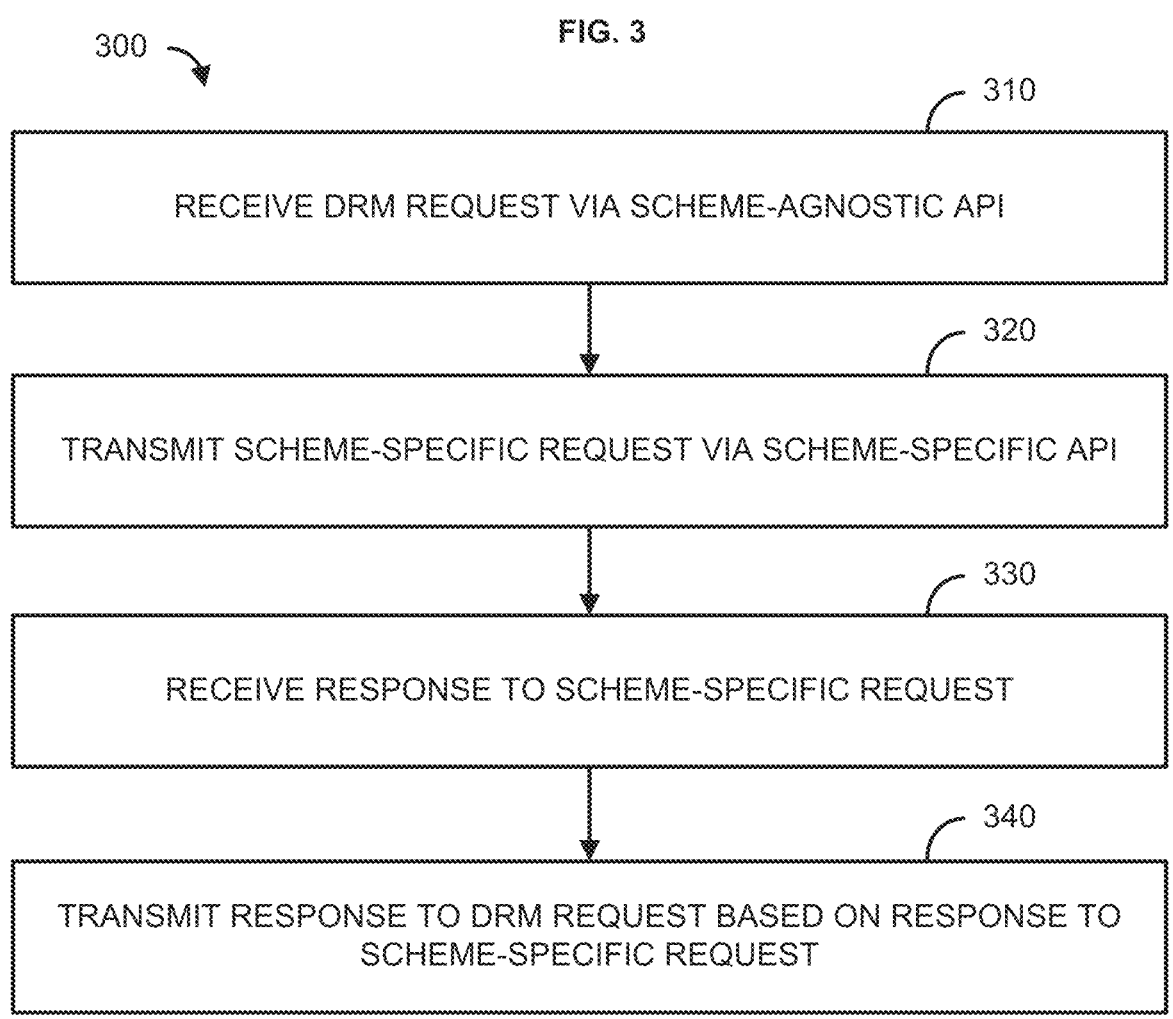
FIG. 3 is a flowchart of an example method.

The user device 202 then processes the response to the second DRM request to allow playback of content. For example, the user device 202 can use a decryption key in the response to the second DRM request to decrypt one or more portions of content. As another example, the user device 202 can use a manifest in the response to the second DRM request to generate requests for one or more portions of streaming content. FIG. 3 is a flowchart 300 of an example method. At step 310 a DRM request can be received via a scheme-agnostic API (e.g., by a shared DRM server 131 from a user device 202). The DRM request can include a request to access or playback content protected under a particular DRM scheme. Accordingly, the DRM request can include a request for an access rights decision, a license, a manifest, and/or a key. The DRM request can include an identifier of the particular DRM scheme. The DRM request can include one or more attributes, including a session identifier, device identifier, user identifier, account identifier, or other data.

At step 320 a scheme-specific request can be transmitted via a scheme-specific API (e.g., by the shared DRM server 131 to a DRM vendor 130). The scheme-specific request can comprise a request encoded according to a particular protocol associated with the particular DRM scheme. The scheme-specific request can include the one or more attributes included in the DRM request received via the scheme-agnostic API. The scheme-specific request can also include a subset of the one or more attributes included in the DRM request received via the scheme-agnostic API. The scheme-specific request can request data corresponding to the data requested in the DRM request received via the scheme-agnostic API. For example, if the DRM request received via the scheme-agnostic API includes a request for an access rights decision for a content item, the scheme-specific request can include a request for an access rights decision for the content item but encoded according to the scheme-specific API corresponding to the particular DRM scheme.

Transmitting the scheme-specific request via the scheme-specific API can include determining the particular DRM scheme as a DRM scheme from a plurality of DRM schemes. For example, the DRM scheme can be determined based on a DRM scheme identifier included in the DRM request received via the scheme-agnostic API. Transmitting the scheme-specific request via the scheme-specific API can include determining the scheme-specific API and/or a DRM vendor 130 corresponding to the determined DRM scheme.

At step 330, a response to the scheme-specific request can be received, e.g. from a DRM vendor 130 via the scheme-specific API by the shared DRM server 131. The response to the scheme-specific request can include an access rights decision, a manifest, a key, or other data. The response to the scheme-specific request can be encoded according to the protocol associated with the determined DRM scheme. At step 340 a response to the DRM request can be transmitted (e.g., to a user device 202 by the shared DRM server 131). The response to the DRM request can be transmitted via the scheme-agnostic API. The response to the DRM request can be generated based on the response to the scheme-specific request received via the scheme-specific API. For example, the response to the DRM request can be generated to include one or more data points included in a payload of the response to the scheme-specific request, e.g., an access rights decision, a license, a manifest, and/or a key. The response to the DRM request can also be generated to include one or more additional attributes, such as an indication for the user device to perform a device identity refresh or a session refresh.

Figure 4:
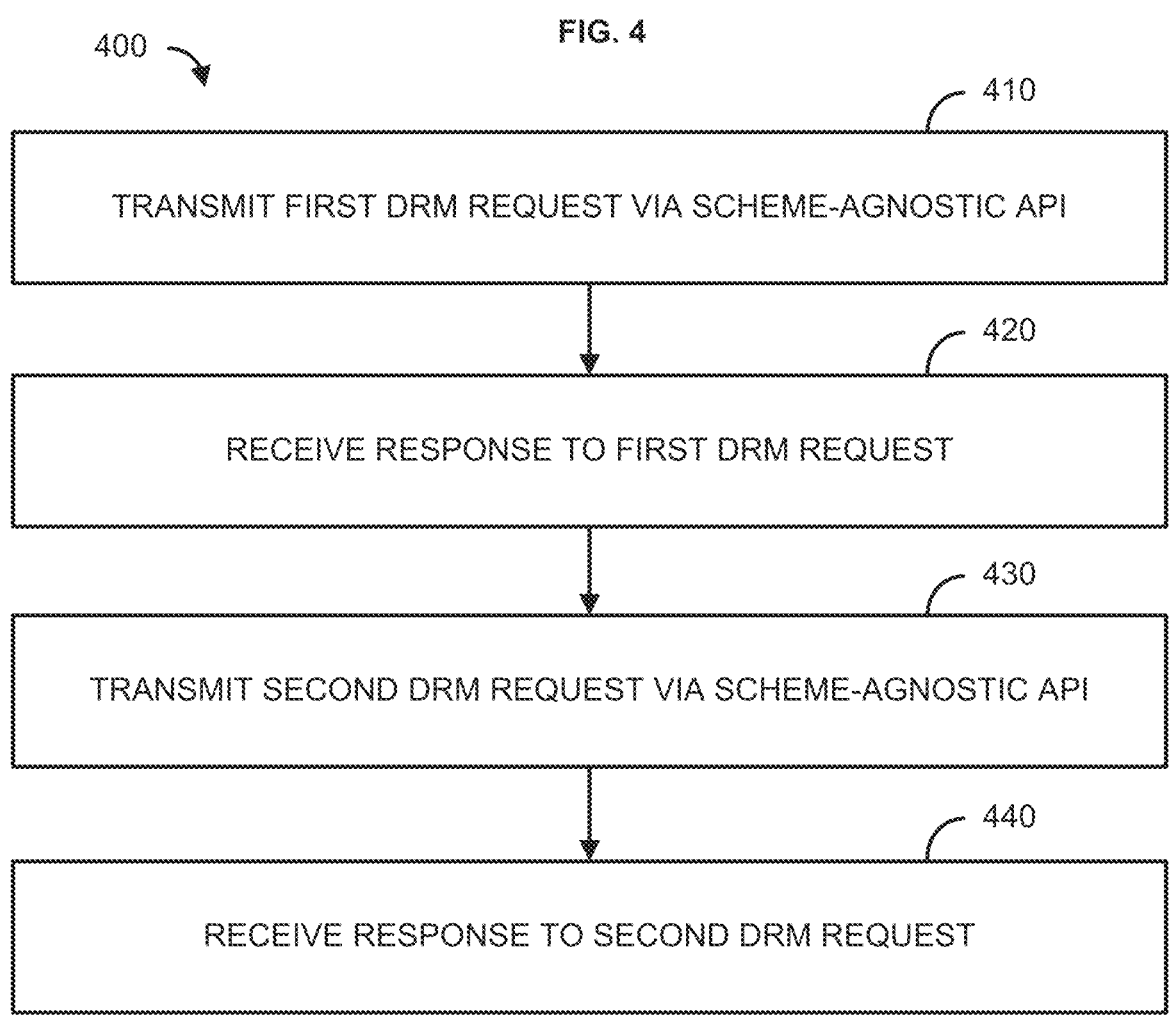
FIG. 4 is a flowchart of an example method.

FIG. 4 is a flowchart 400 of an example method. At step 410 a first DRM request can be transmitted via a scheme-agnostic API (e.g., by a user device 202 to a shared DRM server 131). The first DRM request can comprise a request for an access rights decision, a license, a manifest, a key, or another request facilitating the access or playback of a first content item protected under a first DRM scheme. The first DRM request can include an identifier of the first DRM scheme. The first DRM request can also include an identifier of the first content item. The first DRM request can include one or more attributes, including a device identifier, a user identifier, an account identifier, a session identifier, or other data.

At step 420 a response to the first DRM request can be received (e.g., by the user device 202 from the shared DRM server 131 via the scheme-agnostic API). The response to the first DRM request can include a license, an access decision, a key, a manifest, or other data associated with the playback of the first content item protected under the first DRM scheme. The response to the first DRM request can be generated (e.g., by the shared DRM server 131) based on a response to a first scheme-specific request (e.g., transmitted by the shared DRM server 131 to a first DRM vendor 130 corresponding to the first DRM scheme). For example, the response to the first DRM request can be generated by the shared DRM server 131 based on a response to a first scheme-specific request transmitted to a first DRM vendor via a first scheme-specific API. The payload of the response to the first DRM request can include one or more data items included in the payload of the response to the first scheme-specific request.

At step 430 a second DRM request can be transmitted via the scheme-agnostic API (e.g., by the user device 202 to the shared DRM server 131). The second DRM request can comprise a request for an access rights decision, a license, a manifest, a key, or another request facilitating the access or playback of a second content item protected under a second DRM scheme. The second DRM request can include an identifier of the second DRM scheme. The second DRM request can also include an identifier of the second content item. The second DRM request can include one or more attributes, including a device identifier, a user identifier, an account identifier, a session identifier, or other data. The second content item can be different from the first content item. The second DRM scheme can be different from the first DRM scheme. Thus, requests associated with different DRM schemes can be transmitted to the shared DRM server 131 using the same scheme-agnostic API and/or protocol.

At step 440 a response to the second DRM request can be received (e.g., by the user device 202 from the shared DRM server 131 via the scheme-agnostic API). The response to the second DRM request can include a license, an access decision, a key, a manifest, or other data associated with the playback of the second content item protected under the second DRM scheme. The response to the second DRM request can be generated (e.g., by the shared DRM server 131) based on a response to a second scheme-specific request (e.g., transmitted by the shared DRM server 131 to a DRM vendor 130 corresponding to the first DRM scheme). For example, the response to the second DRM request can be generated by the shared DRM server 131 based on a response to a second scheme-specific request transmitted to a second DRM vendor via a second scheme-specific API. The payload of the response to the second DRM request can include one or more data items included in the payload of the response to the second scheme-specific request.

Figure 5:
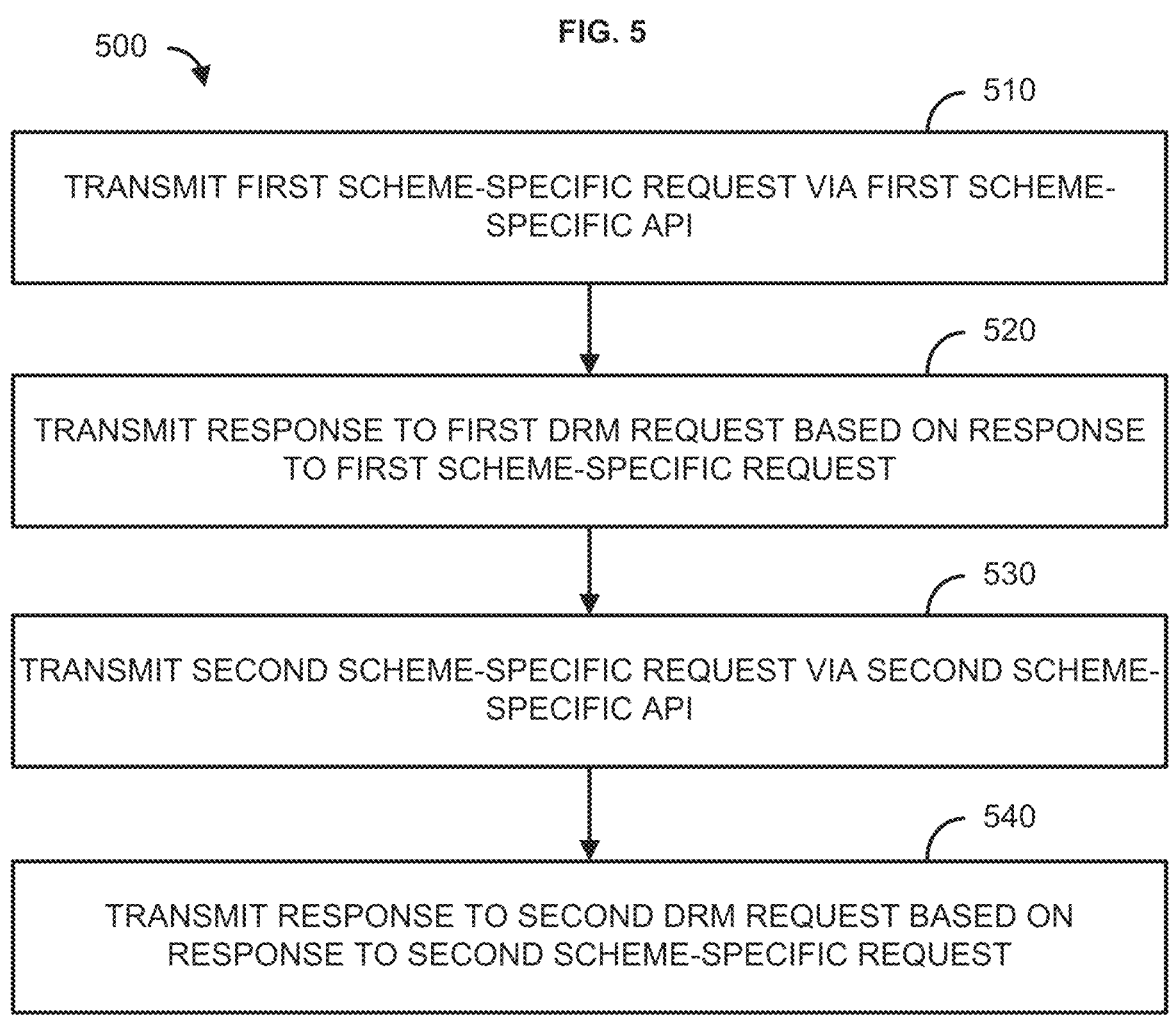
FIG. 5 is a flowchart of an example method.

FIG. 5 is a flowchart 500 of an example method. At step 510 a first scheme-specific request can be transmitted via a first scheme-specific API (e.g., by a shared DRM server 131 to a first DRM vendor 130). The first scheme-specific request, first scheme-specific API and/or first DRM vendor 130 can be associated with a first DRM scheme. For example, the first DRM vendor 130 can be configured to process requests associated with the first DRM scheme via the first scheme-specific API. The first scheme-specific request can be encoded according to a first protocol associated with the first DRM scheme and/or first scheme-specific API.

The first scheme-specific request can be generated based on a first DRM request (e.g., received from a first user device 202 by the shared DRM server 131 via a scheme-agnostic API). The first scheme-specific request can correspond to a type of request of the first DRM request. For example, if the first DRM request comprises a request for a key, then the first scheme-specific request can comprise a request for the key. The first DRM request can include one or more attributes, including a device identifier, session identifier, user identifier, account identifier, or another attribute. These one or more attributes, or a subset thereof, can be included in the first scheme-specific request. The first DRM request can include an identifier of the first DRM scheme. Accordingly, the first DRM scheme can be determined based on the identifier of the first DRM scheme. The first scheme-specific API and/or the first DRM vendor 130 can be determined based on the determined first DRM scheme.

At step 520 a response to the first DRM request can be transmitted via the scheme-agnostic API (e.g., to the first user device 202). The response to the first DRM request can be generated based on a response to the first scheme-specific request (e.g., received via the first scheme-specific API). The response to the first DRM request can include one or more data items included in the payload of the response to the first scheme-specific request. For example, the response to the first DRM request can include an access rights decision, a license, a manifest, a key, or other data included in the response to the first scheme-specific request.

At step 530 a second scheme-specific request can be transmitted via a second scheme-specific API (e.g., by a shared DRM server 131 to a second DRM vendor 130). The second scheme-specific request, second scheme-specific API and/or second. DRM vendor 130 can be associated with a second DRM scheme. For example, the second DRM vendor 130 can be configured to process requests associated with the second DIM scheme via the second scheme-specific API. The second scheme-specific request can be encoded according to a second protocol associated with the second DRM scheme and/or second scheme-specific API. The second DRM scheme can be different from the first DRM scheme. Accordingly, the second DRM vendor 130 and/or second scheme-specific API can be different from the first DRM vendor 130 and/or first scheme-specific API, respectively.

The second scheme-specific request can be generated based on a second DRM request (e.g., received from the first user device 202 or a second user device 202 by the shared DRM server 131 via a scheme-agnostic API). The second scheme-specific request can correspond to a type of request of the second DRM request. For example, if the second DRM request comprises a request for a key, then the second scheme-specific request can comprise a request for the key. The second DRM request can include one or more attributes, including a device identifier, session identifier, user identifier, account identifier, or another attribute. These one or more attributes, or a subset thereof, can be included in the second scheme-specific request. The second DRM request can include an identifier of the second DRM scheme. Accordingly, the second DRM scheme can be determined based on the identifier of the second DRM scheme. The second scheme-specific API and/or the second DRM vendor 130 can be determined based on the determined second DRM scheme.

At step 540 a response to the second DRM request can be transmitted via the scheme-agnostic API (e.g., to the first user device 202 or second user device 202). The response to the second DRM request can be generated based on a response to the second scheme-specific request (e.g., received via the second scheme-specific API). The response to the second DRM request can include one or more data items included in the payload of the response to the second scheme-specific request. For example, the response to the second DRM request can include an access rights decision, a license, a manifest, a key, or other data included in the response to the second scheme-specific request.

Figure 6:
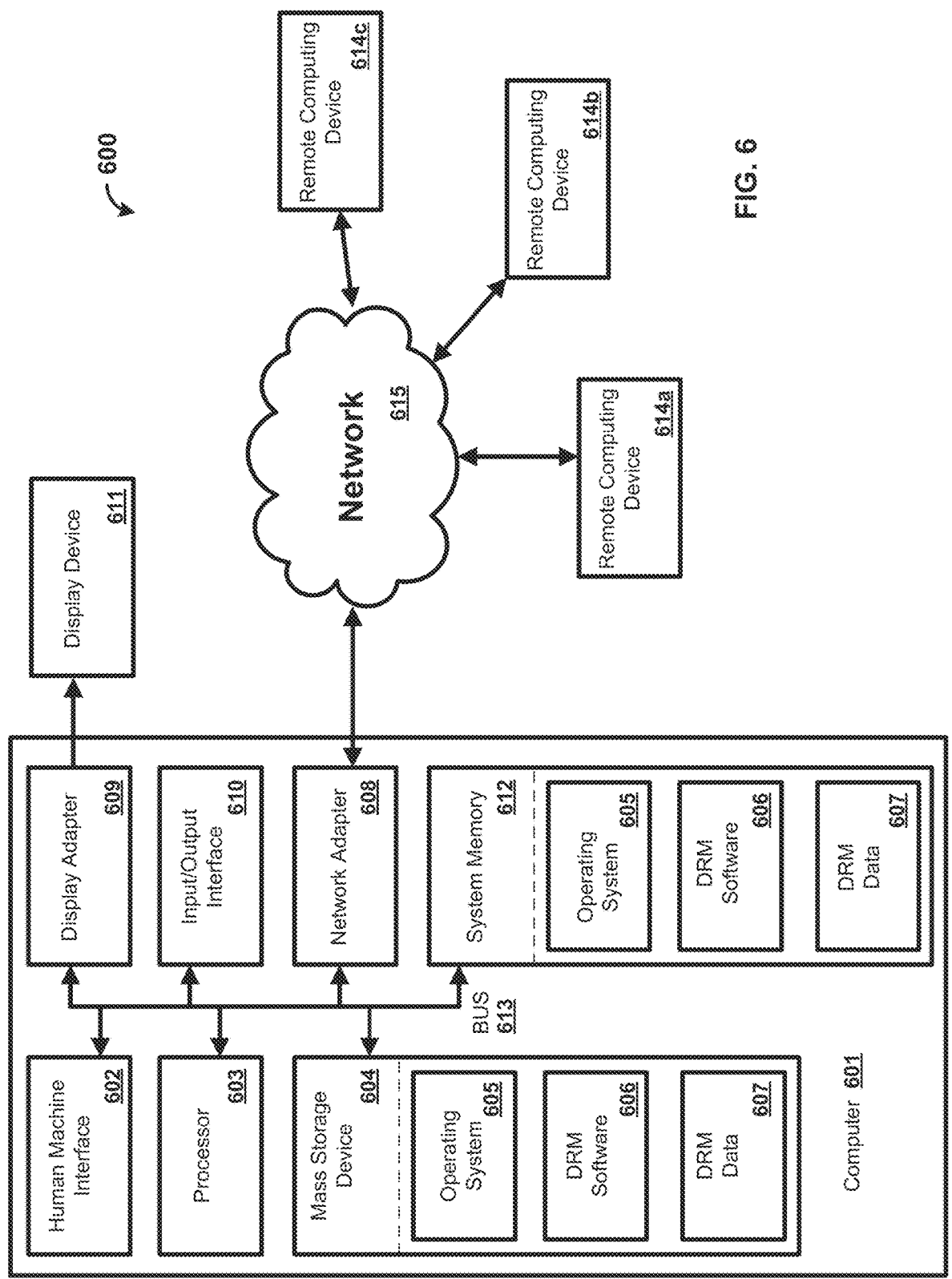
FIG. 6 is a block diagram of an example computing device.

In an exemplary aspect, the methods and systems can be implemented on a computer 601 as illustrated in FIG. 6 and described below. By way of example, the shared DRM server 131 and/or DRM vendor 130 of FIG. 1 can be a computer as illustrated in FIG. 6. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard. Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCh-Express bus, a Personal Computer Memory Card Industry Association (PCM-CIA), Universal Serial Bus (USB) and the like. The bus 613, and all buses specified in this description can also be implemented over a wired or wireless network connection and each of the subsystems, including the one or more processors 603, a mass storage device 604, an operating system 605, DRM software 606, DRM data 607, a network adapter 608, the system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the DRM data 607 and/or program modules such as the operating system 605 and the DRM software 606 that are immediately accessible to and/or are presently operated on by the one or more processors 603.

In another aspect, the computer 601 can also comprise other removable/non-removable, volatile/non-volatile computer storage media. By way of example, FIG. 6 illustrates the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the DRM software 606. Each of the operating system 605 and the DRM software 606 (or some combination thereof) can comprise elements of the programming and the DRM software 606. The DRM data 607 can also be stored on the mass storage device 604. The DRM data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, the display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computer 601 and a remote computing device 614*a,b,c* can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing device 601, and are executed by the one or more processors 603 of the computer. An implementation of the DRM software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
    receiving, via a scheme-agnostic application program interface (API), a first digital rights management (DRM) request comprising an identifier specifying selection of a first DRM scheme of a plurality of DRM schemes;
    sending, based on the identifier specifying selection of the first DRM scheme, via a first scheme-specific API corresponding to the first DRM scheme, a first scheme-specific request;
    receiving, via the first scheme-specific API, a response to the first scheme-specific request; and
    sending, based on the response to the first scheme-specific request, via the scheme-agnostic API, a response to the first DRM request.

2. The method of claim 1, further comprising:
    receiving, via the scheme-agnostic API, a second DRM request comprising an identifier specifying selection of a second DRM scheme of the plurality of DRM schemes;
    sending, based on the identifier specifying selection of the second DRM scheme, via a second scheme-specific API corresponding to the second DRM scheme, a second scheme-specific request;
    receiving, via the second scheme-specific API, a response to the second scheme-specific request; and
    sending, based on the response to the second scheme-specific request, via the scheme-agnostic API, a response to the second DRM request.

3. The method of claim 1, further comprising determining, based on the first DRM request, the first DRM scheme.

4. The method of claim 3, wherein determining the first DRM scheme comprises determining, based on the identifier in the first DRM request, the first DRM scheme.

5. The method of claim 1, wherein the response to the first scheme-specific request comprises one or more of a license decision or a key.

6. The method of claim 1, wherein the first DRM request is associated with a first protocol corresponding to the scheme-agnostic API, and the method further comprises generating the first scheme-specific request according to a second protocol corresponding to the first DRM scheme.

7. The method of claim 6, wherein the response to the first scheme-specific request is associated with the second protocol, the method further comprises generating the response to the first DRM request according to the first protocol.

8. The method of claim 1, wherein the first DRM request comprises one or more business attributes.

9. The method of claim 8, wherein the one or more business attributes are excluded from the first scheme-specific request.

10. A method, comprising:
    sending, via a scheme-agnostic application program interface (API), a first digital rights management (DRM) request comprising an identifier specifying selection of a first DRM scheme of a plurality of DRM schemes;
    receiving, based on the identifier specifying selection of the first DRM scheme in the first DRM request, and via the scheme-agnostic API, a response to the first DRM request;
    sending, via the scheme-agnostic API, a second DRM request comprising an identifier of a second DRM scheme and different from the first DRM scheme; and
    receiving, via the scheme-agnostic API, a response to the second DRM request.

11. The method of claim 10, wherein receiving, via the scheme-agnostic API, the response to the first DRM request comprises receiving a request via a first scheme-specific API associated with the first DRM scheme.

12. The method of claim 11, wherein receiving, via the scheme-agnostic API, the response to the second DRM request comprises receiving a request via a second scheme-specific API associated with the second DRM scheme.

13. The method of claim 11, further comprising sending the request via the first scheme-specific API based on the first DRM request.

14. The method of claim 11, wherein the first DRM request and the second DRM request are associated with a same protocol.

15. The method of claim 10, wherein the response to the first DRM request or the response to the second DRM request comprises one or more of a license decision or a key.

16. The method of claim 10, wherein the first DRM request comprises a network address of a vendor of the first DRM scheme and the second DRM request comprises a network address of a vendor of the second DRM scheme.

17. A method comprising:
sending, via a first scheme-specific application program interface (API) corresponding to a first digital rights management (DRM) scheme of a plurality of DRM schemes, based on a first DRM request received via a scheme-agnostic API, a first scheme-specific request, wherein the first DRM request comprises a first DRM identifier specifying selection of the first DRM scheme of the plurality of DRM schemes;
sending, via the scheme-agnostic API, based on a response to the first scheme-specific request, a response to the first DRM request;
sending, via a second scheme-specific API corresponding to a second DRM scheme different from the first DRM scheme, based on a second DRM request received via the scheme-agnostic API, a second scheme-specific request; and
sending, via the scheme-agnostic API, based on a response to the second scheme-specific request, a response to the second DRM request.

18. The method of claim 17, further comprising:
determining, based on the identifier in the first DRM request, the first DRM scheme; and
determining, based on an identifier in the second DRM request, the second DRM scheme.

19. The method of claim 17, wherein the response to the first DRM request or the response to the second DRM request comprises one or more of a license decision or a key.

20. The method of claim 17, wherein the first DRM request or the second DRM request comprises business attributes comprising one or more of: account information, a content identifier, a device identifier, or a session identifier.

* * * * *